May 28, 1957 W. B. PRIDY 2,793,747
DEBRIS AND POTATO SORTING DEVICE
Filed Oct. 24, 1955 4 Sheets-Sheet 1
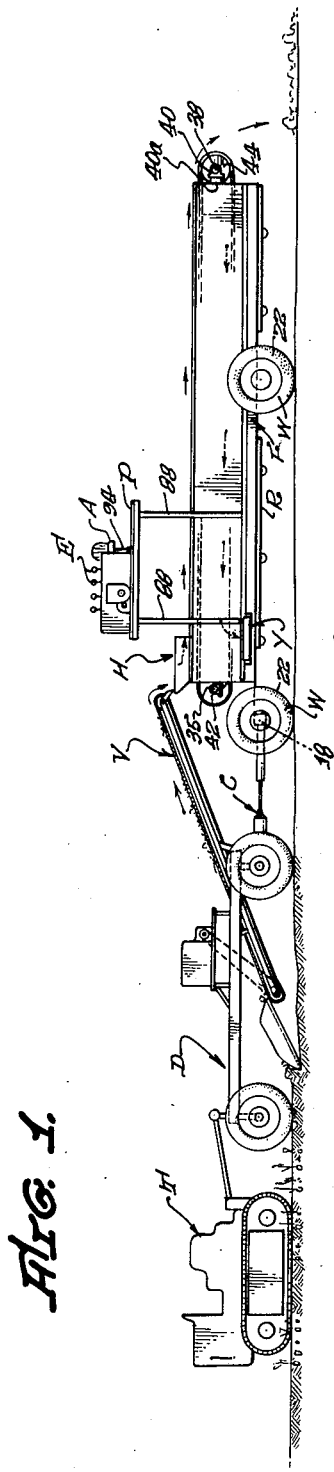
WHETSTINE B. PRIDY,
INVENTOR.
BY
William C. Babcock
ATTORNEY.

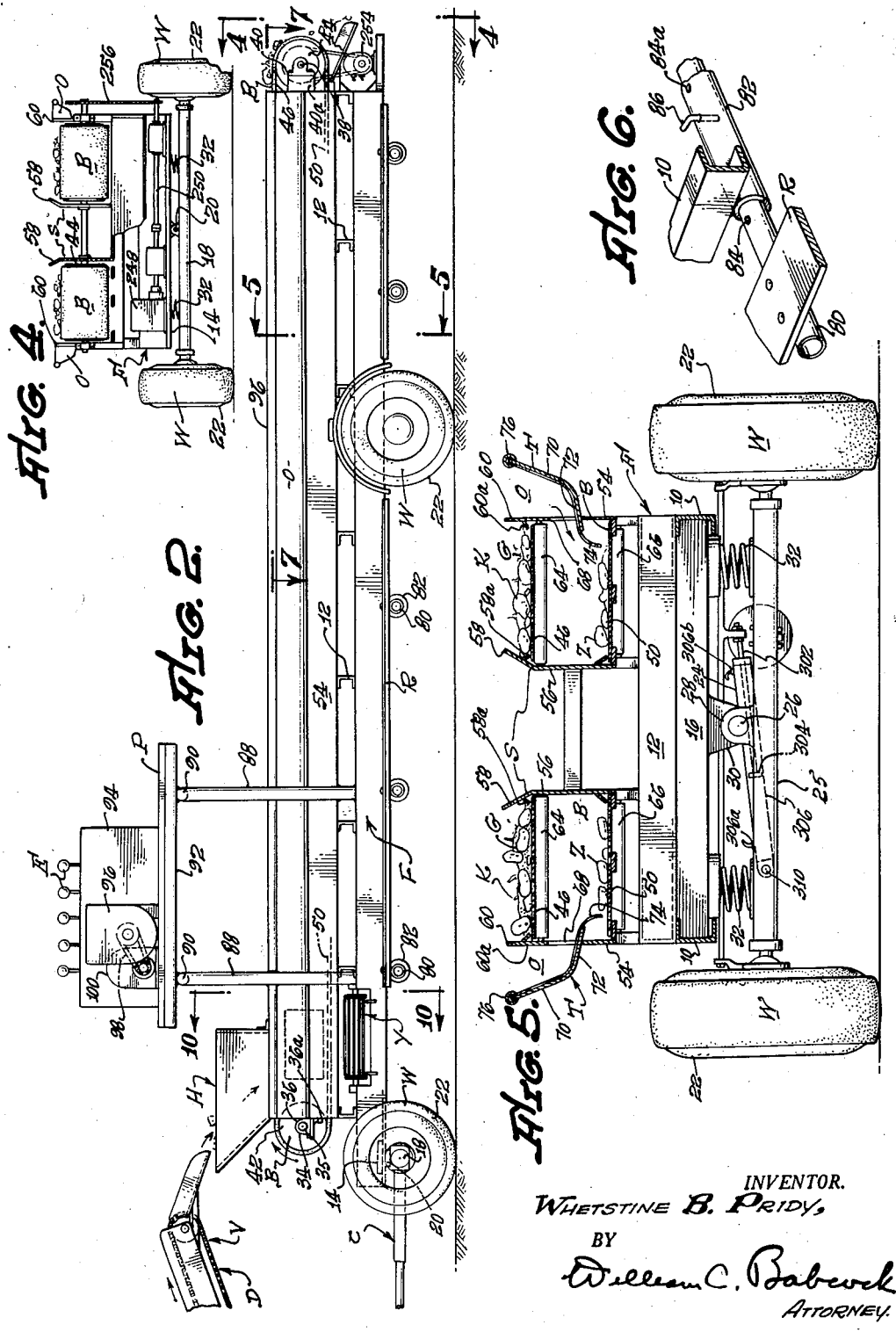

May 28, 1957 W. B. PRIDY 2,793,747
DEBRIS AND POTATO SORTING DEVICE
Filed Oct. 24, 1955 4 Sheets-Sheet 3
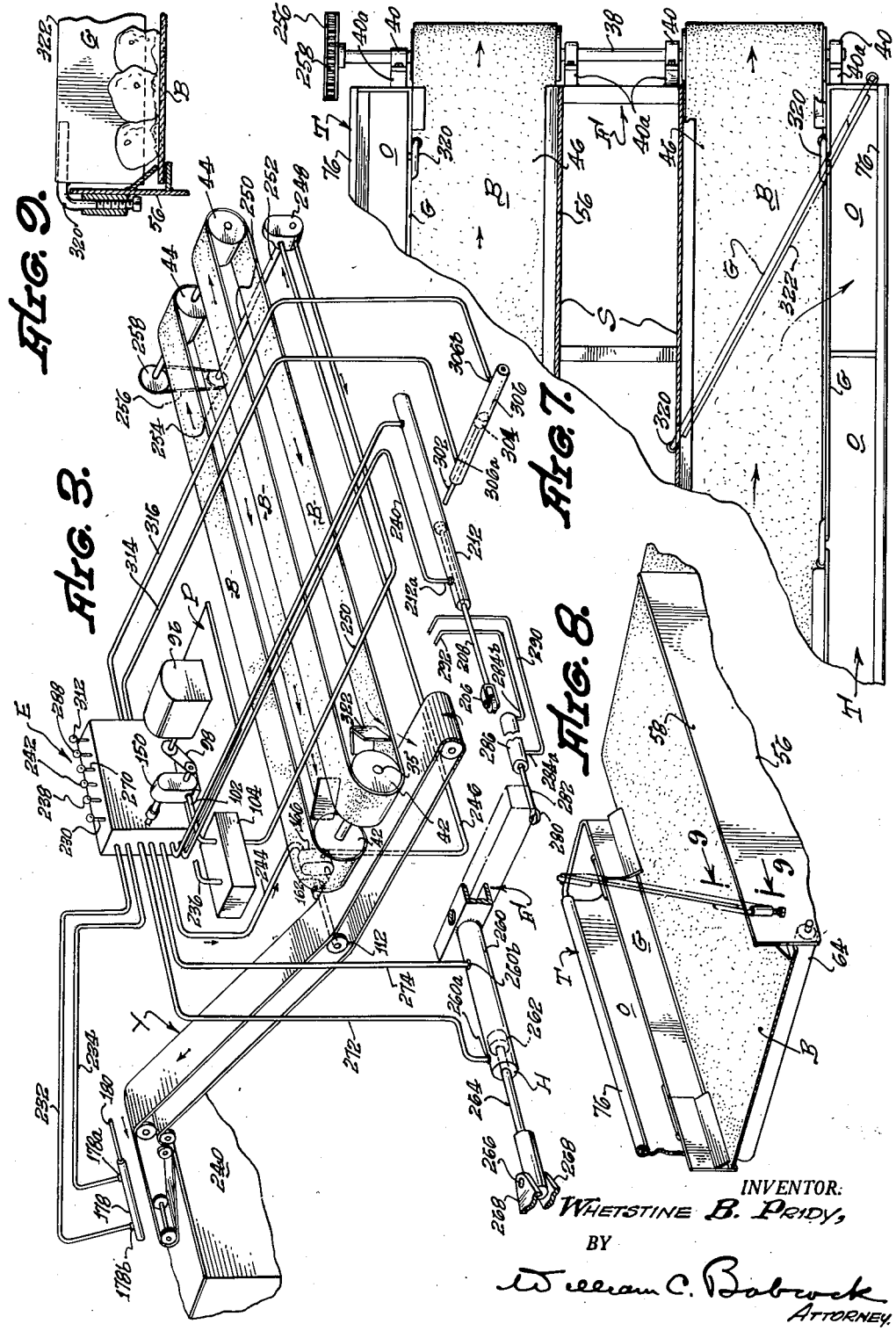
INVENTOR.
*WHETSTINE B. PRIDY,*
BY
*William C. Babcock*
ATTORNEY.

May 28, 1957 W. B. PRIDY 2,793,747
DEBRIS AND POTATO SORTING DEVICE
Filed Oct. 24, 1955 4 Sheets-Sheet 4
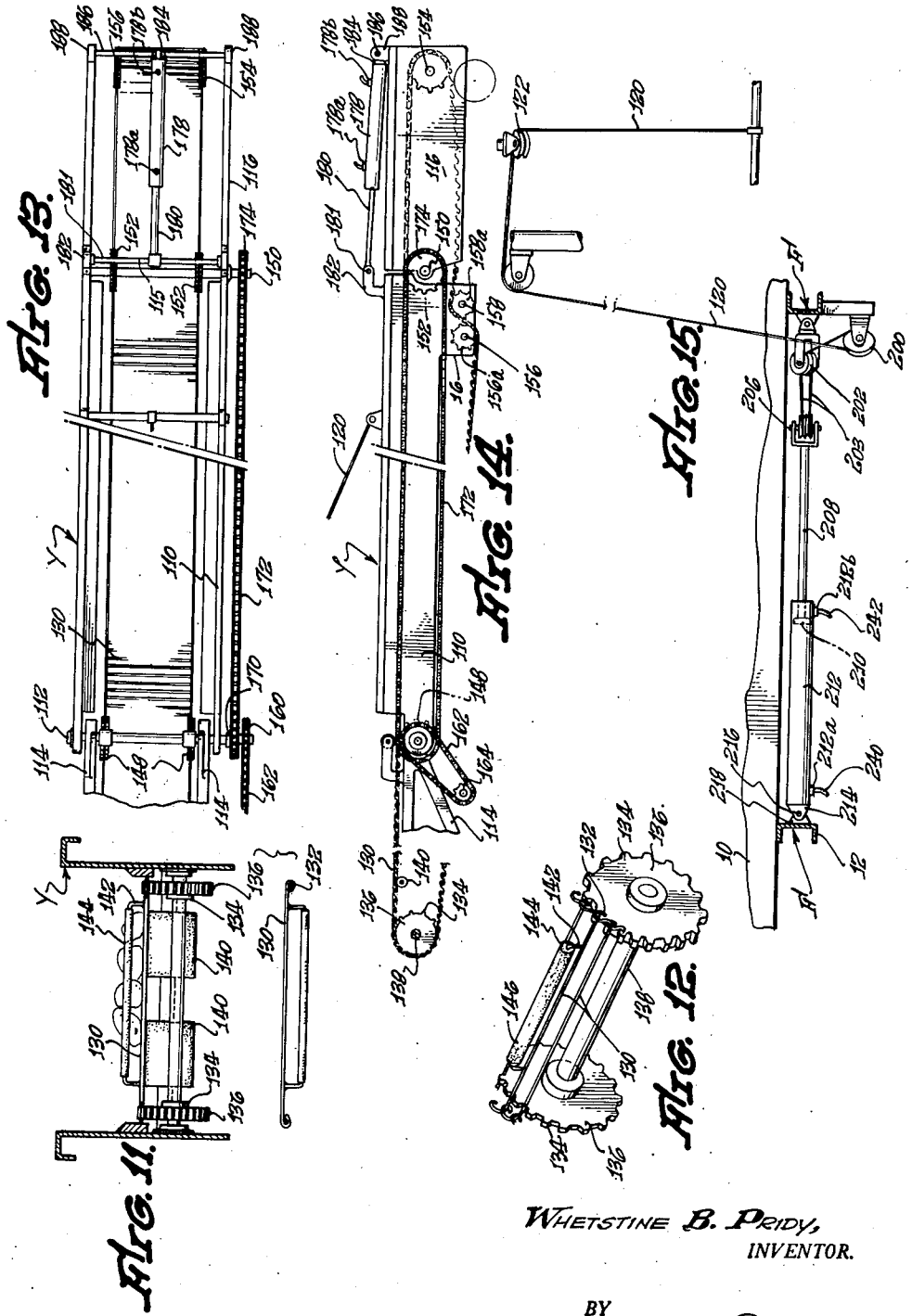
WHETSTINE B. PRIDY,
INVENTOR.
BY William C. Babcock
ATTORNEY.

United States Patent Office

2,793,747
Patented May 28, 1957

2,793,747

DEBRIS AND POTATO SORTING DEVICE

Whetstine B. Pridy, Long Beach, Calif.

Application October 24, 1955, Serial No. 542,397

17 Claims. (Cl. 209—125)

The present invention relates generally to the field of harvesting devices, and more particularly to a potato harvesting device that can be used with a power operated potato digger to separate debris and potatoes discharged therefrom.

The growing of potatoes on a large scale has resulted in the development of a number of various types of power operated diggers, as well as mechanical implements used in conjunction therewith for separating the potatoes from the clods, vines, and debris as the potatoes are discharged into the machine. A number of power operated potato diggers have been designed and are now commercially available that satisfactorily remove the potatoes from the ground, and then either leave them lying on the ground surface, or carry the potatoes and debris associated therewith upwardly on a conveyor belt to be subjected to the action of a mechanism that separates the potatoes from clods, vines and other foreign material. Such mechanisms although commercially available, have proved to be unsatisfactory in many instances, as all or a portion of a potato may be encased in earth. The density of the encasing material and potato are so close that no satisfactory means has been developed to separate one from the other, without the surface of the potato being damaged in the separating process.

In certain areas, such as the San Joaquin valley in California, it has been a generally accepted practice to use a mechanical device to dig the potatoes, and leave same lying in the field. The dug potatoes are then harvested by itinerant laborers who manually pick them from the ground and deposit them in sacks. The hand picking of potatoes has a number of disadvantages, in that, first the grower of the potatoes is dependent on a most unreliable supply of labor which may or may not be available at the time the harvesting of potatoes must be consummated. Furthermore, the hand picking of potatoes is an inefficient operation as each laborer is paid by the number of sacks of potatoes he picks, and as he is interested primarily in filling the sacks up, the sacks normally contain an appreciable amount of foreign material such as vines, clods and the like that must be separated from the potatoes prior to their being graded.

This separating of foreign material from the harvested potatoes is an expensive operation, as the sacks are conveyed to the grading sheds before such separation takes place, and as a result hundreds of pounds of useless material such as vines and clods are hauled out of each truck. The hauling of this foreign material is simply a waste operation in that, dug potatoes could just as well have been transported by the truck in place of the clods, vines and other debris. A particularly serious disadvantage of hand picking potatoes is that after the potatoes are dug they are left on the ground surface for an appreciable length of time, and in those geographical areas such as the San Joaquin valley, the dug potatoes may be burned by the sun prior to being delivered to the grading sheds.

Due to the large scale operation in growing potatoes, a number of attempts have been made to eliminate the disadvantages of manually separating the potatoes from debris by substituting mechanically operated harvesting devices. However, to date, no device has been developed that satisfactorily separates the dug potatoes from the earth and vines normally associated therewith, for to effect such a separation the potatoes are so roughly handled by the mechanical equipment that the exterior surfaces of the potatoes are damaged. Potatoes with damaged outer surfaces are particularly susceptible to the action of bacteria and molds, and as a result the potatoes cannot satisfactorily be stored for extended periods of time. The damaging of the exterior surfaces of potatoes has a further disadvantage in that they present a defaced appearance and cannot be graded as high as non-damaged potatoes, and with a financial loss to the grower.

The primary purpose in devising the present invention is to provide a movable vehicle that can be drawn rearwardly of a power operated potato digger, and have the dug potatoes and debris associated therewith discharged from the digger onto conveyor means that extend to the invention. The vehicle or harvesting device that is the subject of the present patent application is equipped with running board on which workers stand, and separate the potatoes from the debris as the mass is moved rearwardly on the previously mentioned conveyor means associated with the invention. Thus, by the use of this invention, the debris and potatoes can be manually separated from one another, with this operation being carried out as rapidly as by any present day power operated mechanical debris and potato separating means, and the potatoes separated by the use of the present invention being free of damaged surfaces or bruised spots due to contact with rigid mechanical elements.

A major object of the present invention is to provide a potato and debris separating device that can be drawn rearwardly of a power operated mechanical potato digger to have the debris and potatoes dug by the digger discharged thereon, with debris being separated from the mass of discharged material as it moves rearwardly over the invention, and the separated potatoes being manually deposited in troughs from which they travel to a transversely disposed conveyor to be discharged on to a truck that travels along side the invention. The debris and potatoes below a certain minimum size are discharged rearwardly from the invention within the confines of the area over which it is then traveling.

Another object of the invention is to provide a potato and debris separating device that may be easily and quickly moved over public highways from one potato field to another, that is adapted to handle the debris and potatoes produced by a digger that concurrently digs two rows of potatoes, and one that is provided with mechanical and hydraulic means whereby the rate at which debris and potatoes are moved rearwardly on the invention is completely independent of the rate of speed at which the invention is drawn through the field.

Another object of the invention is to supply a potato and debris separating device on which the operator of the device is positioned at a sufficiently high elevation that he at all times may observe the interior of the potato receiving means on the invention, the conveyor that moves the debris and potatoes rearwardly over the device during which time the workers manually separate the debris from the potatoes, as well as the position of a transversely disposed conveyor belt that projects from the invention to discharge the separated potatoes into a truck that drives along side the invention.

A still further object of the invention is to supply a potato and debris sorting device that has a relatively simple mechanical structure, is adapted to be fabricated in such length as to accommodate the particular number of laborers that are desired to be used in manually separating the debris from the potatoes, and the operator of the device due to his elevated position being able at all times to observe the separation of the potatoes from the debris, and to regulate the rate of travel of the conveyor means to the most advantageous speed by the use of controls that may be easily reached by him in this elevated position.

Yet another object of the invention is to furnish a potato and debris separating device that permits the mechanical digging of potatoes, and permits manual labor to be used in the most efficient manner to separate the debris from the potatoes without doing damage to the exterior surfaces of potatoes that would impair their storage qualities.

A still further object of the invention is to supply a potato and debris separating device that permits maximum efficient use of manual labor, in that the laborers are transported on the invention as it moves through the field, and the laborers are not subjected to the arduous strain of drawing sacks of potatoes behind them as has been common in hand picking potatoes in the past.

These and other objects and advantages of the invention will become apparent from the following description of a preferred form thereof, and from the drawings illustrating that form in which:

Figure 1 is a side elevational view of the potato and debris separating device being drawn behind a power operated potato digger;

Figure 2 is an enlarged side elevational view of the device shown in Figure 1;

Figure 3 is a schematic perspective view of the various hydraulically operated components and elements actuated thereby used in the invention;

Figure 4 is a rear elevational view of the device taken on the line 4—4 of Figure 2;

Figure 5 is an enlarged vertical cross-sectional view of the invention taken on the line 5—5 of Figure 2;

Figure 6 is a fragmentary perspective view of a typical portion of the running board assembly;

Figure 7 is a fragmentary top plan view of the invention taken on the line 7—7 of Figure 2;

Figure 8 is a fragmentary perspective view of a portion of one of the conveyors and potato receiving troughs shown in Figure 7;

Figure 9 is a fragmentary enlarged cross-sectional view of the invention taken along the line 9—9 of Figure 8;

Figure 10 is a vertical cross-sectional view of the invention taken on the line 10—10 of Figure 2;

Figure 11 is a vertical cross-sectional view of the potato unloading conveyor taken on the line 11—11 of Figure 10;

Figure 12 is a fragmentary perspective view of one of the sprockets and a conveyor belt with rubber covered flights mounted thereon for use in moving potatoes from the invention to a truck;

Figure 13 is a top plan view of the transversely disposed unloading conveyor shown in Figure 13;

Figure 14 is a side elevational view of conveyor unloading assembly; and

Figure 15 is a fragmentary, schematic view showing the hydraulicly operated control cylinder and cable used in pivoting the unloading conveyor upwardly and downwardly relative to the invention.

Referring now to drawings for the general arrangement of the invention, it will be seen in Figures 1, 2 and 10 that it includes a horizontal substantially rectangular frame F that is supported on wheels W which may be drawn by a hitch C behind a power operated potato digger D. The digger D in turn is drawn by a tractor T or other source of power as may be seen in Figure 1. The digger D is provided with an upwardly and rearwardly extending conveyor V which discharges dug potatoes and debris into an elevated hopper H mounted on the forward portion of frame F. Potatoes and debris are discharged from the hopper H onto two laterally spaced longitudinally extending conveyor belts B as may be seen in Figures 5 and 7 that carry the dug potatoes and the debris rearwardly relative to the frame F.

The invention is provided with running boards R along the sides thereof on which laborers stand to manually separate the debris from the dug potatoes, with the debris being discarded into a space S situated between the conveyor belts B to fall to the ground therebelow. The potatoes remaining on the conveyor belts are either manually disposed in troughs O that extend along the sides of the invention or are deflected therein by rigidly disposed bars G as may be seen in Figure 7, with the bars G so disposed above the upper surface of the conveyor belts B that potatoes below a predetermined size pass thereunder and are discharged onto the ground from the rearward end of the invention.

The invention is supplied with a transversely disposed outwardly extending conveyor Y as may best be seen in Figure 10 that permits potatoes that have been separated from the debris to be discharged into a truck (not shown) that travels along side the invention as it is pulled through the field.

In Figure 2 it will be noted that an elevated platform P is provided on the forward portion of the frame F on which a seat A is situated for the operator of the device to sit. The operator when so disposed can observe the interior of hopper H as well as the upper surfaces of conveyor belts B and the transverse conveyor Y. The rate of travel and the position of the conveyor Y is controllable by a number of manually operated valves E situated at a convenient position to the observer when mounted on the seat A.

With reference to the specific structure of the invention, it will be seen in Figures 2 and 5 that the frame F is formed from two laterally separated, horizontally disposed side pieces 10 that are preferably of channel-shape transverse cross section. The side pieces 10 are rigidly connected to one another by a number of transverse, longitudinally spaced rigid members 12, as well as a forwardly disposed cross piece 14, and rearwardly disposed cross piece 16. A forwardly disposed axle 18 is provided, and movably connected to the cross piece 14 by a suitable pivotal support 20 of conventional design. Two of the wheels W are rotatably mounted on axle 18 and are preferably of a type on which pneumatic tires 22 are disposed. Hitch C is connected to axle 18 and extends forwardly to be removably connected to the rearward end of the digger D as shown in Figure 1. A second transversely disposed axle 25 is located under the rearward portion of the frame F, and has two wheels W rotatably supported on the outer ends thereof, which wheels are preferably equipped with tires 22. A hydraulic cylinder 24 is capable of pivoting transversely relative to the frame, and is so held by horizontally disposed pin 26 that engages a bearing 28 affixed to axle 25 as well as a bearing 30 on the exterior cross piece 16 as may be seen in Figure 5.

Two laterally spaced vertically disposed helical springs 32 extend between the axle 25 and cross piece 16 and tend to maintain frame F in a substantially horizontal position. A horizontally disposed shaft 35 is rotatably supported in a transverse position in bearings 36 above the forward end portion of the frame F as may be seen in Figure 2. A similarly disposed transversely situated shaft 38 is rotatably supported in bearings 40 that are disposed at the rearward end of the frame F. Both the bearings 36 and 40 are rigidly mounted on suitable supports 36a and 40a respectively that extend upwardly from the frame F. Shaft 34 has two laterally separated rollers 42 mounted thereon and similar rollers 44 are mounted on the shaft 38. The rollers 42 and 44 serve to rotatably support the two conveyor belts B, which belts have upper reaches 46 on which potatoes and debris G are deposited as shown in Figure 5, to be carried rearwardly relative to the frame F as will hereinafter be explained in detail. The conveyor belts B also have lower reaches 50 as shown in Figure 5 on which potatoes Z that are substantially free of adhering dirt clods and other foreign material are deposited to be transported forwardly relative to frame F and then delivered to the transversely disposed conveyor Y.

The frame F as may be seen in Figures 2 and 5 has two elongate sidewalls 54 mounted thereon that extend the length thereof. Two elongate side plates 56 extend the length of the frame F and are disposed above the cross pieces 12 and adjacent the inwardly disposed ends of the rollers 42 and 44. The side plates 56 terminate on their upper ends in short upwardly and outwardly extending sections 58 that are disposed above the reaches 46 of the two conveyor belts B. The side pieces 54 have upwardly extending sections 60 thereof that are disposed above belt reaches 46 as shown in Figure 5. Extensions 58 and 60 each have longitudinally extending angularly disposed flanges 58a and 60a respectively, that extend downwardly to almost contact the upper surfaces of the belt reaches 46. The flanges 58a and 60a serve to prevent rocks and other foreign material being lodged between the edges of the belt reaches 46 of conveyor belt B and the interior surfaces of the extensions 58 and 60. A number of transversely disposed belt supporting rollers 64 are situated under the upper reaches 46 of the conveyor belt B, and are rotatably supported by pins or other conventional means from the side walls 54 and side plates 56.

A number of transversely disposed rollers 66 are situated under the lower reaches 50 of the conveyor belt B and serve to movably support same as shown in Figure 5.

Longitudinally extending horizontally situated openings 68 are provided above side pieces 54 at intermediately disposed positions between the rollers 64 and 66 and have two troughs T extending therethrough. Each of the troughs T is preferably fabricated from an elongate sheet of material that is transversely bent or otherwise formed to provide a downwardly and inwardly extending section 70 that is in communication with a second section 72 that projects through one of the openings 68 to terminate in an end portion 74 as shown in Figure 5. The upper edge portions of the trough sections 70 are formed with horizontal longitudinally extending handles 76 that the laborers can grasp when standing on the running boards R as shown in Figures 2 and 6. Each of the running boards R, as may be seen in Figures 2 and 6, has a number of longitudinally spaced transversely positioned lengths of pipe 80 affixed to the underside thereof by bolts or other conventional means, and these pipes being slidably mounted in sections of tubular members 82 that are rigidly affixed to the under side of the frame side pieces 10.

The inwardly disposed end portions of the pipes 80 have longitudinally spaced vertically extending bores 84 formed therein that can be placed in vertical alignment with similarly spaced vertically disposed bore 84a formed in the tubular members 82. When the bores 84 and 84a are disposed in vertical alignment, they can be engaged by L-shaped pins 86 as shown in Figure 6, to removably hold the pipes 80 in the desired outwardly extending positions to maintain the running boards R in the desired spaced relationship with frame F. When the invention is being transported from field to field over the public highways, the pins are removed from the bores 84 and 84a, and the running boards R moved inwardly to contact exterior surfaces of the side pieces 10, and the pins 86 again inserted in the bores to hold the running boards at a minimum transverse spacing relative to one another. In this manner, the running boards R can be adjusted to have the outer side edges thereof spaced at less than the maximum width that a vehicle can have that travels over the public highways.

In Figure 2 it will be seen that two laterally spaced, vertically positioned uprights 88 are mounted on the forward portion of each of the frame side pieces 10, and are connected on their upper ends by a horizontal end piece 90. The uprights 88 are also rigidly connected on their upper portions by two longitudinally extending side members 92. Platform P is supported on the upper surfaces of the members 90 and 92 and extends therebetween. Platform P has the seat A supported thereabove by conventional means 94, and on which seat the operator sits when the invention is being used for a potato and debris separating operation. The platform P also serves as a support for a cabinet 94 that houses the control valves E, as well as an engine 96 which by conventional transmission means drives a hydraulic pump 100. The pump 100 has the suction side connected by a conduit 102 to a suitable reservoir 104 that is at all times at least partially full of hydraulic fluid.

In Figure 10 it will be seen that the potato digger conveyor V is adapted to discharge debris and potatoes K into the hopper H. The hopper H as shown in Figure 10 has two laterally separated openings 106 formed therein that are in alignment with the upper reaches 46 of the conveyor belts B, and serve to deliver potatoes and debris K thereto. The potatoes and debris K so delivered to the conveyor belts B are carried rearwardly on the upper reaches 46 thereof as shown in Figure 5.

In Figure 10 it will be noted that the transverse conveyor belt Y extends under the lower reaches 50 of the conveyor belts B, and has an upper reach thereof that is disposed within the confines of a first rigid frame 110. The frame 110 has the lower end portion thereof pivotally supported on a horizontally disposed shaft 112 as shown in Figure 13, which shaft is rotatably supported by bearings 114 affixed to the frame F. The frame 110 has a transversely disposed shaft 115 mounted on the outer end portion thereof, which shaft serves to pivotally support a second rigid frame 116 as shown in Figure 10. The first frame 110 can be pivoted upwardly and downwardly relative to frame F by the use of a cable 120 that is affixed to the first frame 110 as shown in Figure 10, with the cable extending upwardly to pass over sheaves 122 that are supported from platform P.

The transverse conveyor belt Y is of the type shown in Figure 12 in which a number of longitudinally spaced, laterally positioned resilient wires 130 are bent or otherwise formed on their ends to define links 132, which links define two continuous spans that are adapted to engage the teeth 134 of two sprockets 136. The two sprockets 136 are mounted on opposite ends of a shaft 138 that is rotatably supported on frame F as shown in Figure 10, with the shaft so disposed that the conveyor belt Y passes under the two lower reaches 50 of conveyor belt B. A number of rollers 140 are rotatably mounted between the two side pieces 10 of frame F and movably engage the under side of the conveyor belt Y to maintain a portion of the upper reach thereof within the confines of frame F in a horizontal position.

In Figure 12 it will be noted that a number of transversely disposed inverted U-shaped members 142 are rigidly attached to links 132 with each member supporting an elongate hollow cylindrical shell 144 that is either formed of a resilient material or covered with a layer of such material as for example rubber or the like. The purpose of the U-shaped members 142 and shells 144 is to prevent movement of sorted potatoes relative to the conveyor Y as the potatoes are carried upwardly on the conveyor when the first frame is pivoted to the position shown in phantom line in Figure 10. Two laterally separated sprockets 148 are mounted on the shaft 112 as may be seen in Figure 13 and movably engage the links 132 of conveyor belt Y.

The second frame 116 is pivotally connected to the first frame 110 by a transversely disposed shaft 150 that has two laterally separated sprockets 152 mounted thereon. The second frame 116 has a transverse shaft 154 mounted on the outer extremity thereof, which shaft has two sprockets 156 affixed thereto that engage links 132 of the transverse conveyor belt Y as shown in Figures 10, 13 and 14. Two transverse shafts 156 and 158 are rotatably supported from suitable bearings 160 that are affixed to the lower outer end portion of the first frame 110, which shafts support idling sprockets 156a and 158a respectively. Idling sprockets 156a and 158a engage the links 132 of the conveyor belt Y. The conveyor belt Y is driven by a sprocket 160 affixed to one of the end portions of shaft 112 as shown in Figure 13, with this sprocket in turn engaging an endless belt 162 that extends to a driving sprocket 164 shown in Figure 14. Sprocket 164 is rotated by a hydraulic fluid operated motor 166, the position of which is shown in Figure 3. Shaft 112 also has a sprocket 170 affixed thereto from which an endless belt 172 extends to a sprocket 174 affixed to shaft 150 as shown in Figure 13.

The second frame 116 is adapted to be pivoted relative to the first frame 110 to a downwardly and outwardly extending position where it can be disposed within the confines of the bin body of a truck (not shown). When the second frame is so positioned potatoes are supported on members 142 and shells 144 as they are moved downwardly into the confines of the truck bin, and are accordingly subjected to a minimum of physical shock in being deposited therein. Pivotal movement of the second frame 116 relative to the first frame 110 is effected by the use of an elongate hydraulic cylinder 178 that is provided with a piston (not shown) from which a piston rod 180 extends. The piston rod 180 is pivotally connected on its free end to a rod 181 supported in brackets 182 rigidly mounted on the outer end portion of the frame 110. The hydraulic cylinder 178 on its most outwardly disposed end is provided with an eye 184 that pivotally engages a pin 186 affixed to upwardly extending lugs or brackets 188 mounted in a rigid position on the outer end of the second frame 116. Hydraulic cylinder 178 has two fluid connections 178a and 178b formed on the end portions thereof. When fluid is discharged into the connection 178a as will hereinafter be explained in detail, and discharged from the connection 178b, the second frame 116 is pivoted upwardly and outwardly relative to the first frame 110.

Pivotal movement of the first frame and second frame in unison relative to the frame F is achieved by looping an inwardly disposed portion of the cable 120 over two rotatably supported pulleys 200 and 202 as shown in Figure 15, and continuing the extension of the cable inwardly within the confines of the frame F to form a loop 203 that engages a pulley 206 mounted on one end of the piston rod 208. The free end of the loop 203 is rigidly affixed to a portion of the frame F or other convenient non-movable structure affixed thereto. A piston rod 208 has the piston 210 mounted on the free end thereof that is slidably supported within the confines of a hydraulic cylinder 212. Cylinder 212 has an eye 214 mounted on the inwardly situated end thereof that engages a pin 216. The pin 216 is rigidly affixed to a bracket or lug 218 mounted on the interior surface of one of the side pieces 10. Hydraulic cylinder 212 is provided with two apertures 212a and 212b in the end portions thereof through which fluid can flow. When fluid under pressure is directed into aperture 212b by means that will later be discussed, the piston 210 is moved in such a direction as to draw an increasing length of the piston rod 208 within the confines of the cylinder 212, and in so doing lengthening the cable loop 204 with concurrent upward pivotal movement of the first frame 110 as well as the second frame 116 pivotally supported therefrom. By permitting fluid in the cylinder 212 to discharge therefrom to the aperture 212b, the length of the piston rod 208 outside the cylinder may be increased, and as a result the cable 120 is moved to pivot frame 110 downwardly from the position shown in phantom line in Figure 10 to that shown in solid line in the same figure.

The valves E as previously mentioned are used to actuate and control the hydraulic operated components of the invention. In Figure 3 it will be seen that a manually operated valve 230 of conventional design is so arranged as to permit discharge of hydraulic fluid from the pump 100 to either a conduit 232 connected to aperture 178b on hydraulic cylinder 178 or conduit 234 extending to aperture 178a formed in the same cylinder. As hydraulic fluid is discharged to either the conduit 232 or conduit 234, the conduit through which fluid is not being discharged is so connected to valve 230 that hydraulic fluid flows from the cylinder therethrough to a common header 236 connected to the reservoir 104. Flow of hydraulic fluid to cylinder 178 results in pivotal movement of the second frame 116 relative to frame 110 which permits the desired adjustment of the second frame relative to the truck mounted bin 240 as shown in Figure 3.

Actuation of hydraulic cylinder 212 to pivot the first frame 110 as shown in Figures 14 and 15 is controlled by use of a valve 238 that permits fluid to flow through the aperture 212a or 212b. The apertures 212a, 212b are connected to conduits 240, 242 respectively, in the same manner as described in connection with the hydraulic cylinder 178. As fluid is caused to flow through the conduit 242 to the aperture 212b, the piston 210 is moved inwardly in hydraulic cylinder 212, and the first frame 110 as well as the second frame 116 supported on the outer end thereof is pivoted upwardly from the position shown in solid line in Figure 10 to one of the positions indicated by phantom line in the same figure. The positions of the first and second frames can be so arranged that potatoes are discharged over to conveyor Y into the confines of the truck bin 240 as shown in Figure 3 without damage being done to the potatoes.

A particularly valuable feature of the present invention, is that the rate at which the conveyor belts B travel to carry potatoes and debris towards the rearward end of the frame F to permit manual separation of the debris from the potatoes can be regulated independently of the rate of travel at which the invention is pulled through the fields behind the power operated potato digger D. Thus, when the material being discharged into the hopper H carries a high percentage of vines, foreign material, clods and like objects, the rate of travel of the conveyor belts B can be slowed down to permit the workers to separate this large amount of foreign material from the potatoes. However, when the material dumped into the hopper carries a high percentage of potatoes, and a small amount of clods, vines and other foreign material, the rate of travel of the conveyor belts B can be speeded up, as the workers standing on the side board R will have relatively little material to manually discard into the space S existing between the two conveyor belts B. It will, of course, be apparent that the transversely disposed conveyor belt Y will only be required to transport potatoes upwardly thereon for discharge into a truck body 240 as shown in Figure 3 when potatoes are being carried rearwardly on the two conveyor belts B. Therefore, it is desirable that the conveyor belts B and the conveyor Y operate concurrently at the desired rate fo speed, and to this end, fluid is discharged through a conduit 244 by manipulation of a valve 242 to the hydraulically operated motor 166, which motor in turn through the shaft 112 drives belt 162 as shown in Figures 3 and 15. Fluid passing through the hydraulically operated motor 166 flows through a conduit 246 that extends rearwardly along the frame F to a second hydraulically operated motor 248. The fluid after passing through motor 248 to cause the rotation of same is discharged into a conduit 250 as shown in Figure 3 that leads back to the reservoir 104.

Actuation of the motor 248 results in rotation of shaft 250 as shown in Figure 3, which shaft has a sprocket 254 mounted thereon that engages an upwardly extending endless belt 256. Movement of the belt 256 causes rotation of a sprocket 258 that is mounted on one end of the shaft 38 as shown in Figure 2 to which rollers 44 are rigidly secured. The position of hopper H relative to the conveyor V mounted on the power operated digger D is such that potatoes on the conveyor are discharged therein. The positioning of the hopper in this manner is achieved by including a hydraulic cylinder 260 as shown in Figure 3 and a part of the hitch C. The cylinder 260 is rigidly connected to the axle 18 shown in Figure 4 to cause the pivoting thereof in the turning of the invention at the end of a field or when the vehicle is being transported from field to field on a public highway. Cylinder 260 has a piston 262 slidably mounted within the confines thereof from which a piston rod 264 extends to be pivotally connected by a pin 266 or other conventional means to horizontally disposed vertically separated lugs 268 shown in Figure 3. Lugs 268, of course, are rigidly affixed to the rearward portion of the power operated digger D as shown in Figure 1.

Hydraulic cylinder 260 is provided with two apertures 260a, 260b in the ends thereof. By the use of a valve 270 shown in Figure 3, fluid can be discharged from the pump 100 through a conduit 272 to aperture 260a to move the piston 262 rearwardly in hydraulic cylinder 260 to the extent that the rearward edge of the conveyor V on digger D is disposed in the desired relationship with the hopper H shown in Figure 1. The valve 270 is of a type that also permits fluid to be discharged through a conduit 274 that is connected to the aperture 260b on hydraulic cylinder 260. When fluid is discharged through the conduits 272 or 274, fluid is concurrently discharged from the opposite conduit by piping (not shown) to the reservoir 104 to again be used in the actuation of the hydraulically operated components of the invention.

In some instances it is desirable to be able to independently pivot the axle 18 on the invention, and to achieve this result the axle is pivotally connected by a pin 280 as shown in Figure 3 to a rearwardly extending piston rod 282 that is connected to a piston 284 slidably mounted in the confines of an elongate hydraulic cylinder 286. Hydraulic cylinder 286 has apertures 284a and 284b formed in the ends thereof. A valve 288 shown in Figure 3 permits fluid from the pump 100 to be discharged through either a conduit 290 leading to aperture 284a or a conduit 292 leading to the aperture 284b. By discharging fluid from the pump through either of the conduits 290 or 292 and discharging fluid from the hydraulic cylinder 284 through the conduit opposite that to which fluid is entering the cylinder, the piston rod 282 may be so moved as to pivot the axle 18 to the desired degree in guiding the invention.

On occasion, in moving over exceedingly rough ground, or a field, a portion of which is on a slope, it is desirable to be able to tilt the rearward portion of the frame F relative to the axle 24 shown in Figure 5, to maintain the rearward portion of frame F and the conveyor belt B mounted thereon in a substantially horizontal position. To this end, the cross piece 16 shown in Figure 5 is provided with a downwwardly extending lug 300 to which one end of a piston rod 302 that is slidably connected on one end to a piston 304 slidably disposed inside a hydraulic cylinder 306. The end of hydraulic cylinder 306 opposite that from which the piston rod 302 extends is pivotally connected by a pin 310 to the axle 24 as shown in Figure 5. Hydraulic cylinder 306 has two apertures 306a and 306b formed on the end thereof, and by the use of a valve 312 shown in Figure 3, fluid can be caused to discharge from pump 100 through either of two conduits 314 or 316 that are connected to the apertures 306a and 306b respectively. By the manipulation of the valve 312, the position of the piston 304 in the cylinder 306 can be varied, with this variation of the piston relative to the cylinder causing a pivotal movement of the axle 24 relative to the frame F, and the major portion of the frame F being maintained in a substantially horizontal position as a result thereof.

The use and operation of the invention is extremely simple. The invention of course is first attached to the power driven potato digger D by use of the hitch C, the engine 96 is then started to actuate pump 100 to furnish a source of hydraulic fluid under pressure to actuate the components shown in detail in Figure 3. With the pump 100 so operating, the operator climbs to the platform P and assumes his position on seat A, and is then ready to manipulate the valves E to control the operation of the invention. Appropriate valves E are manipulated to cause fluid to flow from the pump 100 through conduit 272 to so adjust the longitudinal length of the hitch C that the conveyor V on the power operated digger D is so disposed as to discharge debris, potatoes and other foreign material into the confines of the hopper H. The operator on the seat A is sufficiently elevated to at all times determine the character of material being discharged into the hopper H, from which hopper the material is divided to pass through the openings 106 thereof onto the upper reaches 46 of the horizontally disposed conveyor belts B.

In the event the harvested material contains a large percentage of foreign material such as clods, vines and the like, the operator by manipulation of the valve E causes the conveyor belts B to rotate at such a rate that the upper reaches 46 thereof pass by the workers mounted on the running boards R at a relatively high rate to permit this excessive foreign material to be picked up and thrown downwardly in the space S between the belts B that is provided for this purpose. This discarded foreign material when thrown into space S falls downwardly onto the ground situated below the invention, and over which the forward portion of the invention already has passed. Thus, the possibility of the same foreign material being handled twice is completely eliminated.

Either prior to or soon after the initiation of the harvesting operation, a truck having the body 240 mounted thereon as shown in Figure 3 is brought alongside the invention, and the operator by manipulation of the proper valves E raises the first frame 110 to a position as shown in Figure 3 where it extends above the truck body, and the second frame 116 then being pivoted downwardly into the confines of the body to minimize the height of the drop of the potatoes as they leave the conveyor Y and fall to the bottom of the body 240 or onto the surface of the layer of potatoes already deposited on the bottom.

Due to the elevated position the operator of the invention occupies on seat A, he is in a position to at all times observe the potatoes being moved on the various conveyor belts of the invention and whether the potatoes being discharged from the conveyor belt Y are substantially free of all foreign material such as clods or pieces of earth clinging thereto, as well as pieces of vines that may be left in association with the potatoes. The ability of the operator of the invention to immediately detect whether foreign material is being carried upwardly with potatoes on the conveyor belt Y is of the utmost importance, for he is then in a position to caution the laborers to exercise more care in separating the debris from the potatoes. Thus, the detection of foreign materials with the potatoes is made at a sufficiently early time that further contamination can be avoided, rather than detecting the foreign material with the potatoes after they have been transported to the loading shed.

Laborers standing on the running board R as previously mentioned throw the foreign material into space S between the two conveyor belts B, and have the option of leaving the potatoes Z on the conveyor belt to be automatically discharged into the trough after they are substantially at the end of the frame F by deflecting bars G shown in Figure 7 that extend rearwardly and outwardly above the upper surfaces of the belt reaches 46, and are removably affixed to the upper extensions 58 and 60 of the side walls. The deflecting bars G are removably mounted on the wall extension by clips or suitable spring means 320. By maintaining the lower edge of deflecting bars G at a particular elevation above the upper surfaces of the belt reaches 46, potatoes of less than a minimum size are permitted to pass under the deflecting bars G and be discharged from the rearward end of the belts B onto the ground surface. Those potatoes above a predetermined size contact the bars G and are deflected into the trough T to be directed downwardly to the upper surfaces of the forwardly moving lower reaches 50 of the conveyor belts B. The lower reaches 50 of the conveyor belts B move forwardly relative to the frame F, and carry the selected potatoes therewith until the potatoes contact two angle-shaped deflecting plates 322. Potatoes upon contacting the deflecting plates 322 are moved outwardly relative to the belt surface on which they are resting, and are displaced therefrom to fall on the upper surface of the transversely disposed portion of the conveyor belt Y.

This first section of the conveyor belt Y situated within the confines of the frame F remains in a fixed horizontal position at all times, and serves to transport the potatoes transversely across the frame to discharge them onto the upper surface of the portions of the conveyor belt Y mounted inside this first and second frame 110 and 116 respectively. The potatoes, as they are moved by the conveyor belt Y, are prevented from rolling downwardly due to the flights 146 affixed at spaced intervals on the conveyor belt as shown in Figure 12. Likewise, the potatoes as they are transported downwardly by the third section of the conveyor belt Y are prevented from falling therefrom until substantially the lower extremity of the belt is reached. Thus, the potatoes in being separated from the debris, clods and other foreign material are subjected to a minimum of rough handling, and as a consequence the skin surface of even the most delicate potatoes do not have bruises, cuts, fissures or other imperfections formed therein due to the harvesting operation.

Although the invention herein shown and described is fully capable of achieving the objects and providing the advantages hereinbefore mentionied, it is to be understood it is merely illustrative of the present preferred embodiment of the device, and that there is no intention to limit the details of the construction of the invention to the details herein shown and described, other than is defined in the appended claims.

The invention claimed is:

1. A potato and debris sorting device for use with a power operated potato digger that discharges the dug potatoes and debris associated therewith from the rearward end of an upwardly and rearwardly extending conveyor that includes: an elongate rigid first frame; wheel means that support said frame in a substantially horizontal position; potato receiving means mounted on the forward portion of said frame; a hitch to connect said frame to said digger to permit said dug potatoes to be discharged into said receiving means; two laterally spaced, horizontally disposed, endless conveyor belts that are so rotatably supported on said frame as to have potatoes and debris discharge on the upper reaches thereof and convey same rearwardly, and to convey potatoes discharged on the upper surfaces of the lower reaches thereof forwardly; a second frame pivotally connected to one side of said first frame and extending outwardly therefrom; a third frame pivotally connected to the outer end of said second frame; a transversely disposed endless conveyor belt positioned on said second and third frames and extending under said two horizontally disposed conveyor belts; roller means that support said transversely disposed belt in said position; two running boards disposed on opposite sides of said frame on which workers stand to manually separate debris from said potatoes on said horizontal conveyor belts, said debris being thrown into said space between said horizontal conveyors to fall on the ground below; a source of hydraulic fluid under pressure; independently operable hydraulic means to rotate said horizontal conveyor belts, rotate said transverse belt, pivot said second frame relative to said frame, and pivot said third frame relative to said second frame; hydraulic fluid conducting means that connect said independently operable hydraulic means to said source; a platform supported from the forward end portion of said frame at a sufficient elevation that a person situated thereon can observe the interior of said receiving means, the upper reaches of said horizontal conveyors, and said second and third frames; valve means that can be operated from said platform to control the rate of flow of said fluid from said source through said conducting means; two longitudinally extending troughs disposed on opposite sides of said first frame that discharge potatoes deposited therein onto the upper surfaces of the lower reaches of said horizontal belts; and means that deflect potatoes on said lower reaches therefrom onto said transverse conveyor belt.

2. A potato and debris sorting device as defined in claim 1 in which said wheel means are two transversely disposed axles pivotally supporting the forward and rearward portions of said frame, and said rearward axle having hydraulically actuatable means associated therewith that can be controlled by said valve means to maintain said first frame and two horizontal conveyor belts in a substantially horizontal plane as said device travels over terrain on which said rearward wheel means are disposed at an angle with the horizontal.

3. A potato and debris sorting device as defined in claim 2 in which said potato receiving means is a hopper that is formed with two laterally separated openings in the bottom thereof that are disposed over the forwardly positioned portions of the upper reaches of said horizontal conveyor belts.

4. A potato and debris sorting device as defined in claim 3 in which said hitch includes a hydraulically actuatable means that can be controlled by said valve means to so regulate the distance between said digger and said first frame that potatoes and debris are discharged from said digger conveyor into said hopper.

5. A potato and debris sorting device as defined in claim 4 in which said two horizontal conveyor belts are rotatably supported on first and second roller means disposed at the forward and rearward ends of said belts, and said second roller means is rotated by a first hydraulically actuatable motor that is supplied with said fluid from said source by said conducting means, and the rate at which said first motor rotates said roller means controlled by the adjustment of said valve means.

6. A potato and debris sorting device as defined in claim 5 in which said second frame and said third frame are each provided with independent hydraulically acuatable means, and each of said hydraulically actuatable means being supplied with said fluid from said source by said conducting means, and the position that said second frame pivots to relative said first frame, and said third frame pivots to relative said second frame being controlled by the quantity of said fluid delivered to said hydraulically actuatable means associated with said second and third frames by the use of said valve means.

7. A potato and debris sorting device as defined in claim 6 in which said running boards are supported on rigid transversely disposed members, with said members being slidably supported from said frame to permit said running boards to be moved inwardly towards one another to a predetermined minimum spacing when said device is being transported on a public highway.

8. A potato and debris sorting device as defined in claim 7 in which said transversely disposed members are provided with locking means to hold said running boards at said minimum spacing with one another, as well as in positions in which said running boards are separated by more than said minimum distance.

9. A potato and debris sorting device as defined in claim 8 in which one of said roller means supporting said transverse conveyor is rotated by a second hydraulically actuatable motor, with said second motor being supplied with fluid from said source by said conducting means, and the rate at which said second motor rotates being controlled by the use of said valve means.

10. A potato and debris sorting device as defined in claim 9 in which said source of hydraulic fluid under pressure is a pump that is rotated by a prime mover that operates independently of movement imparted to said device as it is moved by being drawn behind said digger.

11. A potato and debris sorting device as defined in claim 10 in which said pump is provided with a reservoir that is connected to the suction side thereof, and said reservoir having fluid returned thereto by said conducting means after said fluid has been used to actuate said motors and hydraulically actuatable means.

12. A potato and debris sorting device as defined in claim 11 in which said valve means are disposed in an elevated position above said platform, and said platform has a seat mounted thereon on which an operator can sit as he manipulates said valve means to regulate the rate of travel of said horizontal and transverse conveyor belts to that at which said workers can most advantageously separate the debris from said potatoes.

13. A potato and debris sorting device as defined in claim 12 in which said troughs have outer wall portions that extend upwardly above said upper reaches of said two horizontally disposed conveyor belts, with said frame supporting two laterally separated longitudinally extending walls adjacent the inner edges of said upper reaches that define an opening therebetween in which said debris can be discarded.

14. A potato and debris sorting device as defined in claim 13 in which two elongate rigid members are provided that have locking means mounted on two ends thereof to removably affix said members to said walls and rearwardly extending trough portions, said members when so mounted disposed above the rearward portions of said upper reaches and extending outwardly at an angle relative thereto to deflect potatoes of greater diameter than the spacing between the upper surface of said reaches and the lower edges of said members into said troughs.

15. A potato and debris sorting device as defined in claim 14 in which said two horizontal conveyor belts are formed of a resilient material to provide a continuous surface on which potatoes can fall from said hopper to be transported rearwardly without damage being done thereto.

16. A potato and debris sorting device as defined in claim 15 in which said transverse conveyor belt is formed of a plurality of spaced, transversely disposed, resilient wires to permit said potatoes to be deflected from said lower reaches of said horizontal belts to fall on said transverse conveyor belt without damage being done to said potatoes.

17. A potato and debris sorting device for use with a power operated potato digger that discharges the dug potato from the rearward end of an upwardly and rearwardly extending conveyor that includes: an elongate rigid first frame; first and second transversely disposed axles connected to the forward and rearward portions of said frame; wheel means mounted on said axles to movably support said frame; a potato receiving hopper formed with two laterally separated discharge openings supported at an elevated position on the forward end of said frame; a longitudinally adjustable hitch mounted on the forward end of said frame to connect same to said digger and dispose the rearward end of said digger conveyor over said hopper; two elongate horizontally disposed conveyor belts having upper and lower reaches that extend rearwardly from positions forwardly of said hopper to pass under said discharge openings therein to positions substantially at the rear end of said frame, said belts laterally separated to define an opening therebetween that is not in vertical alignment with a portion of said frame; first and second transversely disposed roller means that rotatably support the forward and rearward end portions of said horizontal conveyor belts; a transversely disposed endless conveyor belt situated on the forward portion of said frame and having a first section that passes below said two rearwardly extending conveyor belts, a second section that projects outwardly from said frame, and a third section that extends outwardly from said second section; third roller means that rotatably support said first, second and third sections of said transversely disposed conveyor; a second rigid outwardly extending frame that is pivotally supported from said first frame and rotatably supports the portion of said third roller means over which said second conveyor section travels; a third rigid outwardly extending frame that is pivotally supported from the outer end portion of said second frame, said third frame rotatably supporting the portion of said third roller means over which said third conveyor section travels; two elongate horizontally disposed running boards mounted on opposite sides of said frame on which workers can stand; two elongate longitudinally extending chutes disposed on opposite sides of said frame, said chutes sloping downwardly and inwardly to direct potatoes deposited therein onto the upper surfaces of the lower reaches of said horizontally disposed belts; a platform supported at a sufficient elevation above the forward portion of said frame that a person situated thereon can view the upper reaches of said horizontal conveyor belts, the interior of said hopper, and the upper surface of the second section of said transverse conveyor; a source of hydraulic fluid under pressure; first and second hydraulically operated means which when actuated pivot said axles relative to said frame to maintain said first and second conveyor belts in a substantially horizontal plane; second and third hydraulically operated means which when actuated rotate said two horizontally disposed conveyor belts and said transverse conveyor belt; a fifth hydraulically operated means which when actuated pivots said second and third frames relative to said first frame; a sixth hydraulically operated means which when actuated pivots said third frame relative to said second frame; first, second, third, fourth, fifth, and sixth hydraulic fluid conducting means that extend from said source to said first, second, third, fourth, fifth and sixth hydraulic means; first, second, third, fourth, fifth and sixth valve control means operable from said platform that independently regulates the rate of flow of said fluid from said source to said first, second, third, fourth, fifth and sixth hydraulic fluid conducting means; two longitudinally extending walls disposed adjacent the inwardly disposed edges of the upper reaches of said two horizontal conveyor belts; two elongate potato deflecting bars that can be removably mounted above the rearward portions of the upper reaches of said two horizontal conveyor belts to deflect potatoes remaining thereon, after debris associated with said potatoes has been thrown by workers standing on said running boards into said opening, into said chutes; and deflecting means mounted above the forward portions of the upper surfaces of the lower reaches of said horizontal belts that deflect potatoes therefrom onto said first section of said transverse conveyor belt.

References Cited in the file of this patent

UNITED STATES PATENTS

| | | |
|---|---|---|
| 2,328,299 | Schwab | Aug. 31, 1943 |
| 2,379,198 | Templeton | June 26, 1945 |
| 2,562,338 | Snyder | July 31, 1951 |